UNITED STATES PATENT OFFICE.

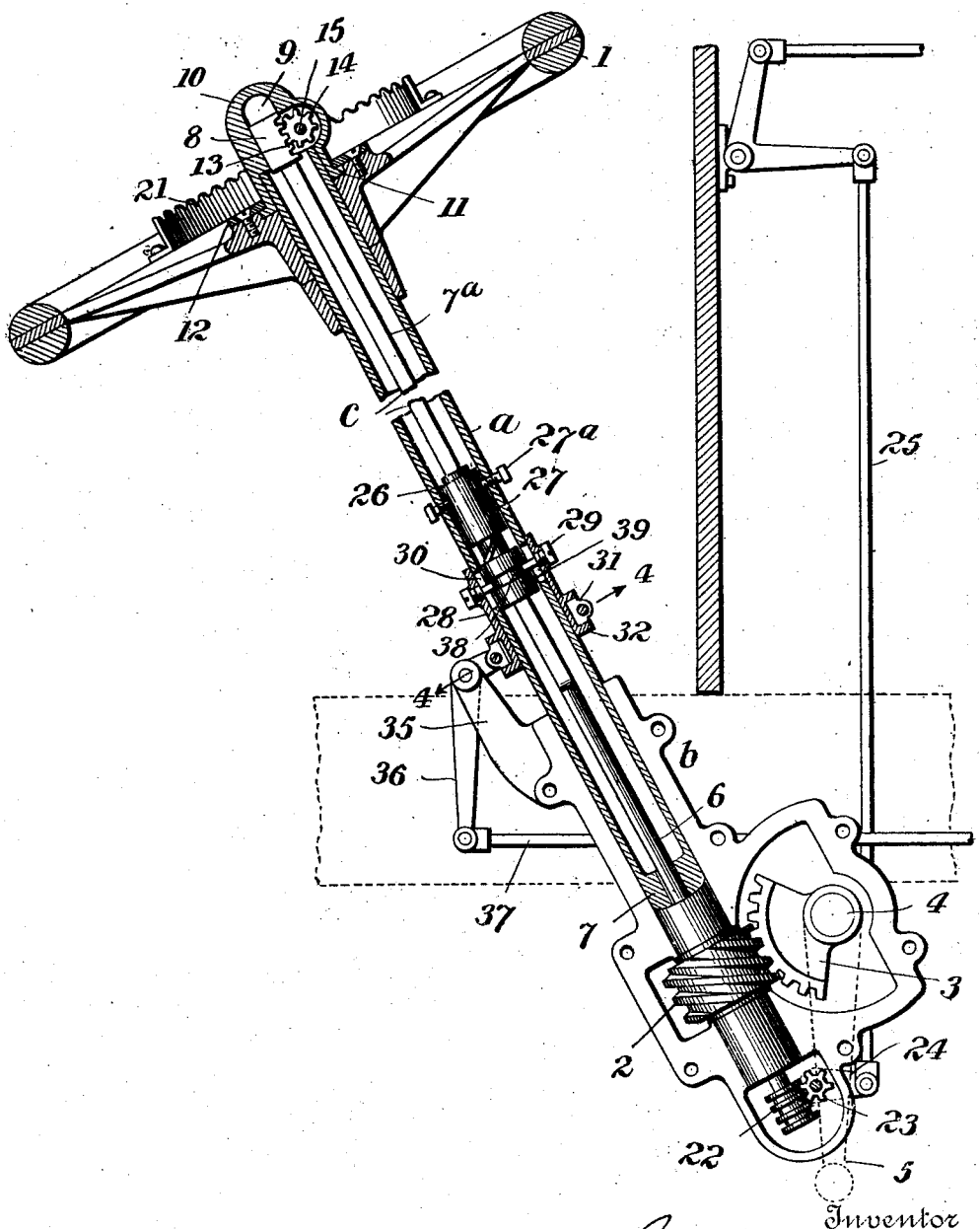

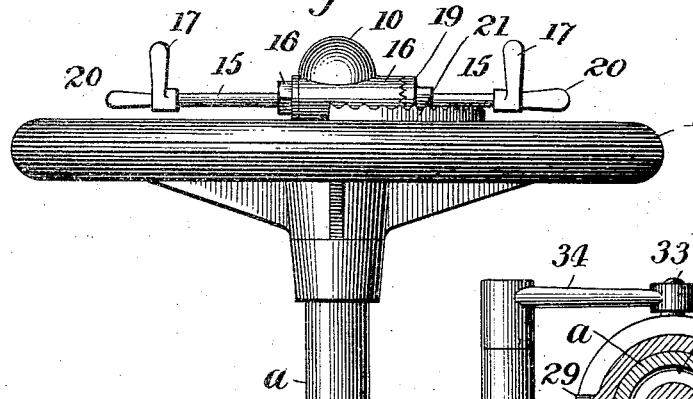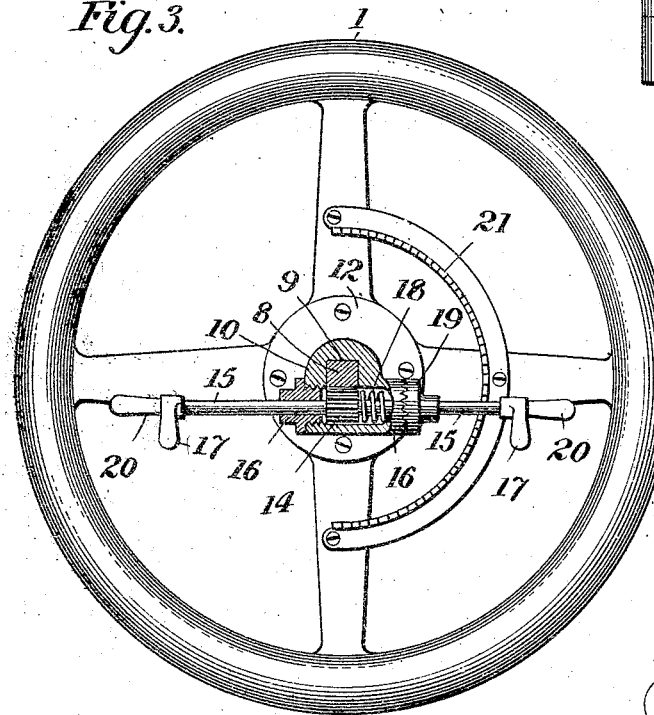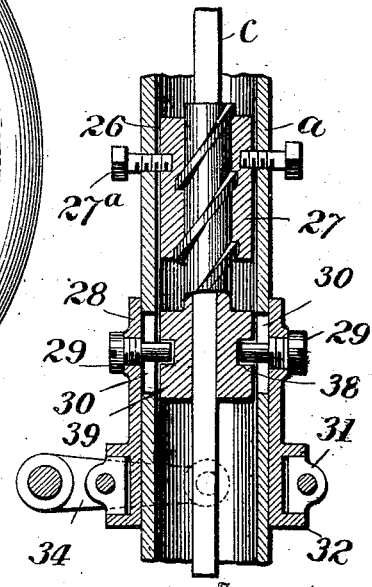

JAMES W. PACKARD, OF LAKEWOOD, NEW YORK, ASSIGNOR, BY MESNE ASSIGNMENTS, TO PACKARD MOTOR CAR COMPANY, OF DETROIT, MICHIGAN, A CORPORATION OF MICHIGAN.

MOTOR-CONTROLLING MECHANISM FOR MOTOR-VEHICLES.

1,022,751.      Specification of Letters Patent.      Patented Apr. 9, 1912.

Application filed April 20, 1906. Serial No. 312,823.

*To all whom it may concern:*

Be it known that I, JAMES W. PACKARD, a citizen of the United States, and residing at Lakewood, in the county of Chautauqua and State of New York, have invented certain new and useful Improvements in Motor-Controlling Mechanism for Motor-Vehicles, of which the following is a specification.

This invention comprises improvements in motor controlling mechanism for motor vehicles of the kind illustrated in the patent to Charles Schmidt #775,991. In the invention shown in said patent two rods are arranged within the tubular steering stem of a motor vehicle, and these rods are independently adjustable, longitudinally, with respect to the stem, in order to independently adjust the spark and throttle mechanism of the motor. In the present invention the two adjustments of the motor controlling mechanism are effected by the oscillatory and reciprocatory movements of a single rod, and these movements are effected by a single hand lever arranged to rotate about its own axis and to swing about the axis of the rod and steering stem.

In the accompanying drawing, which illustrates my invention—Figure 1 is a vertical section through the steering stem, the lower end of the stem being shown in side view; Fig. 2 is a side view of the hand wheel or steering wheel, looking from the right in Fig. 1; Fig. 3 is a top plan view of the hand wheel, the head which guides the motor controlling rod and supports the adjusting shaft or lever being shown in transverse section on the line of said lever; Fig. 4 is a section through the steering stem on the line 4—4 of Fig. 1, and Fig. 5 is a section through the steering stem on the line 5—5 of Fig. 4.

Referring to the drawing, *a* indicates a tubular steering stem of a motor vehicle suitably supported at its lower end in a bearing *b*. A hand wheel 1 is secured to the upper end of the stem and a worm 2, secured to the stem at its lower end, engages a sector 3, on a shaft 4, the latter having a lever 5 thereon for connection to the steering wheels. Within the hollow steering stem *a* is arranged a motor controlling rod *c*. The lower portion 6 of this rod is round in cross section and is rotatable within a bearing 7 in the lower end of the steering stem. The upper portion 7ᵃ of the rod is preferably angular in cross section, as shown, and a guide block 8 at the upper end of the rod fits within a guide groove or socket 9 in the head or cap 10 which fits over the upper end of the steering stem and is rotatable with respect to the stem. The guide block or portion 8 at the upper end of the motor controlling rod and the socket 9 in which it is arranged, are both, as shown, angular in cross section, or of some form other than round in cross section, so that the rotation of the head will cause the rotation of the rod, but the rod may move longitudinally within the socket in the rotatable head. As shown in the drawing, the rotatable head 10 has at its lower end an annular flange 11, and a collar or clamping ring 12 fits over the flange and is secured to the hand wheel 1. This collar holds the head in position concentric with the steering stem but permits the head to rotate with respect to the wheel and stem.

Upon the guiding portion 8 of the motor controlling rod is arranged a rack 13 which meshes with a spur pinion 14 upon an adjusting shaft or lever 15 which is arranged at right angles to the steering stem and controlling rod in bearings 16 in the rotatable head 10. As shown in the drawing, this adjusting shaft or oscillatory lever extends to a suitable distance beyond each of the bearings 16 and finger pieces or hand grips 17 project laterally from the lever at convenient points where they may be moved by the operator without necessitating the removal of the hand from the steering wheel. It will be seen that by pressing either of the finger pieces or hand grips 17 in one direction, the motor controlling rod *c* will be raised and the movement of the finger pieces or hand grips 17 in the opposite direction will cause a reverse movement of the rod. A spring 18, surrounding the shaft or lever 15 between the pinion 14 and one of its bearings 16, holds a notched collar 19 yieldingly against a similarly notched surface on the bearing, so that while the shaft or lever 15 may be rotated about its axis by applying pressure to the finger-pieces or hand grips 17, yet the lever will be held against accidental rotation on its axis and the motor controlling rod will be held in any position of longitudinal adjustment within the steering stem by the engagement of the collar 19 with the notched end of the adjacent bearing 16.

Finger pieces or handles 20 are arranged at the ends of the lever by means of which the operator may conveniently swing the lever and the rotatable head about the axis of the steering stem *a*. This movement of the adjusting lever parallel with the plane of the rim of the hand wheel causes the rotation of the motor controlling rod *c* with respect to the steering stem and hand wheel, by reason of the engagement of the angular or guiding portion 8 of the rod with the socket 9 in the rotatable head. A segmental rack 21, secured to the hand wheel, engages the lever 15 and holds the latter in any position of angular adjustment with respect to the wheel.

From the foregoing it will be clear that to effect a longitudinal adjustment of the motor controlling rod with respect to the steering stem, the adjusting lever 15 is rotated about its own axis by means of the finger pieces or hand grips 17, and in order to rotate the motor controlling rod with respect to the steering stem the adjusting lever 15 is swung about the axis of the steering stem and the rod. A single adjusting lever accomplishes both movements of the controlling rod and the operator may use either or both hands to accomplish these adjustments, as may be convenient or desirable.

At the lower end of the motor controlling rod *c* is secured a circular rack 22 which engages a pinion 23 which, when the controlling rod *c* is moved longitudinally, actuates an arm 24 and suitable connections 25 for adjusting either the throttle or the spark mechanism of the motor. The circular rack 22 permits the rod *c* and steering stem to turn without, in any way, binding upon the rod or affecting its adjustment. Preferably the longitudinal movement of the rod is utilized for adjusting the throttle mechanism, while the rotary movement of the rod with respect to the steering stem, is utilized to adjust the spark mechanism. As shown in the drawing, a worm 26 having steeply pitched threads, is arranged upon the angular portion of the controlling rod *c*, or loosely splined thereon, so that it will turn therewith, and yet permit the rod to move longitudinally through the worm. This worm engages a nut 27 arranged within the steering stem and surrounding the worm 26. The nut 27 is secured against movement within the stem by suitable means, such as the set screws 27ᵃ. A sleeve 28 surrounds the steering stem and is connected to the worm 26 by pins 29 which are secured to the sleeve 28 and extend through longitudinal guide slots 30 in the stem into an annular recess 38 in a boss or collar 39 on the lower end of the worm. It will be readily seen that any rotary movement given to the controlling rod *c* by the movement of the adjusting lever 15 about the axis of the steering stem will cause the worm 26 to turn in the fixed nut 27, and thereby cause the collar 39 and sleeve 28 to move upward or downward. A collar 31 is fitted into a suitable annular recess or bearing 32 on the sleeve, and trunnions 33, projecting from the collar, are engaged by the arms 34 of a yoke which is pivoted upon a bracket 35 secured to the bearing *b*. An arm 36 upon this yoke is connected by suitable connecting means 37 to either the spark controlling mechanism or the throttle mechanism (not shown) of the motor. It will be understood, of course, that if the connection 37 extends to the spark mechanism the connection 25 will extend to the throttle mechanism, and vice versa.

From the foregoing description, the operation of the invention will be clear without further extended explanation.

What I claim is—

1. The combination of a hollow steering stem provided with a hand wheel, of a motor controlling rod arranged within the stem, means actuated by turning said rod, means actuated by reciprocating said rod, a hand lever for turning the rod extending at right angles to the stem adjacent to the wheel, and connections between said hand lever and said rod comprising a rack and pinion for reciprocating the rod.

2. The combination of a steering stem, a motor controlling rod within the stem, said rod having a rack at its upper end, a head rotatably mounted at the upper end of the stem and having a guide-way permitting longitudinal movement of the rod but preventing its rotation within the head, and an adjusting lever journaled transversely in the head and having a pinion engaging said rack.

3. The combination of a steering stem, a motor controlling rod within the stem, a cylindrical rack at the lower end of the stem, devices movable by the rack for operating one motor-controlling mechanism, a nut fixed within the stem, a worm loosely splined on the rod and engaging the nut, devices movable by the worm for operating another motor-controlling mechanism, and means for adjusting said rod longitudinally and angularly with respect to the stem.

4. The combination of a steering stem, a hand wheel secured thereto, a head rotatable with respect to the stem and hand wheel, a motor-controlling rod movable longitudinally with respect to the head and rotatable therewith, means actuated by turning said rod, means actuated by reciprocating said rod, a lever journaled transversely in the head for turning the latter and having means connected therewith for raising and lowering the rod, said lever projecting at each side of the head and having finger-pieces for rotating it about its axis.

5. The combination of a steering stem, a hand wheel secured thereto, a head rotatable with respect to the stem and hand wheel, a motor-controlling rod movable longitudinally with respect to the head and rotatable therewith, said rod having a rack at its upper end, means actuated by turning said rod, means actuated by reciprocating said rod, a lever journaled transversely in the head for turning the latter, a pinion upon said lever engaging said rack, means for holding said head against rotation, and means for holding said lever against rotation about its axis.

6. The combination of a hollow steering stem, a wheel mounted thereon, a rod movable longitudinally relative to the stem to operate one of the motor controlling means and rotatable about its axis to operate another motor controlling means, a hand lever rotatable about its own axis to reciprocate the rod and rotatable about the axis of the stem to rotate the rod, means on the wheel for locking the hand lever against movement about the stem, and means on the hand lever for locking it against rotation about its own axis.

7. The combination of a hollow steering stem, a hollow head, a flange connecting said head rotatably with said stem, a rod movable relatively to said stem and head to operate one motor controlling means, and rotatable about its axis with said head to operate another motor controlling means, a hand lever journaled in said head and adapted to rotate said head and rod, and a toothed connection between said hand lever and rod and mounted in said head, whereby a rotary movement of said hand lever about its own axis will reciprocate said rod.

In testimony whereof I affix my signature in presence of two witnesses.

JAMES W. PACKARD.

Witnesses:
RUSSELL HUFF,
F. E. PAINE, Jr.